United States Patent [19]

Pile et al.

[11] 3,731,400
[45] May 8, 1973

[54] SPINAL NERVE TRACER

[75] Inventors: Donald L. Pile, Charles E. Grandell, Arthur H. Flye, Henry R. Scheuermann, Sr., all of Topeka, Kans.

[73] Assignee: said Pile, by said Grandell, Flye, and Scheuermann

[22] Filed: Jan. 24, 1972

[21] Appl. No.: 220,262

[52] U.S. Cl. ..................................................35/17
[51] Int. Cl. ..........................................G09b 23/32
[58] Field of Search...........................................35/17

[56] References Cited

UNITED STATES PATENTS

| 1,343,141 | 6/1920 | Kenagy | 35/17 |
| 1,581,736 | 4/1926 | Hassler | 35/17 |
| 2,537,573 | 1/1951 | Conschafter | 35/17 |

Primary Examiner—Harland S. Skogquist
Attorney—D. A. N. Chase

[57] ABSTRACT

Display apparatus for instructional and demonstrative purposes and for use by practitioners in the healing arts. The apparatus employs a simulated, erect human spine having a series of vertebrae, each rotatable to the left or right or shiftable out of proper lateral alignment to simulate a misalignment condition. Pictorial illustrations of the left and right sides of the human anatomy in frontal views flank the spine on opposite sides thereof, and have transparent zones at selected terminal nerve endings of the spinal nerves. Electric lamps are disposed behind the illustrations adjacent the respective zones. As a particular vertebra is rotated or shifted out of proper alignment, the appropriate lamp or group thereof are energized to illuminate the corresponding zone or zones to thereby visually indicate the organ, muscle, bone or tissue structure affected by interference with the spinal nerve emanating from the displaced vertebra. In this manner, nerve impulses are traced from the emission of particular spinal nerve at the intervertebral foramen level to the affected nerve endings.

10 Claims, 8 Drawing Figures

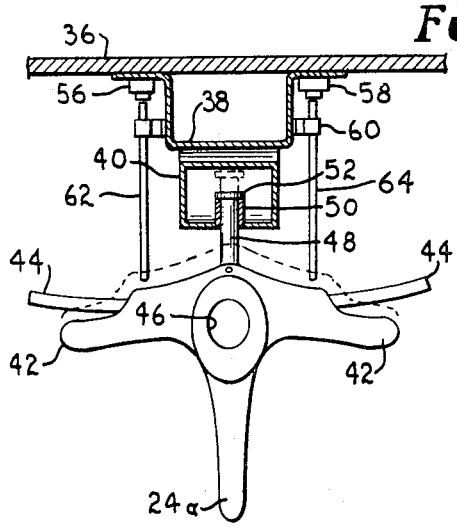
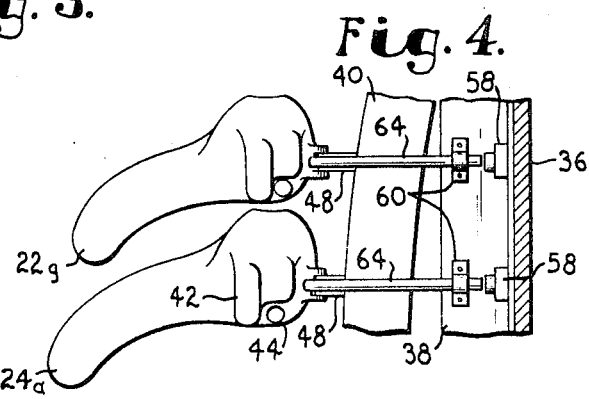
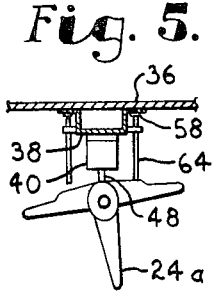
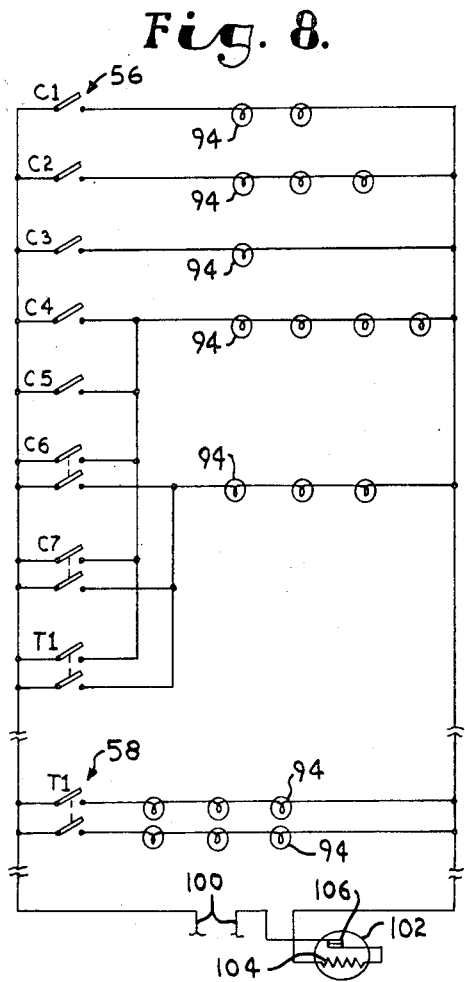
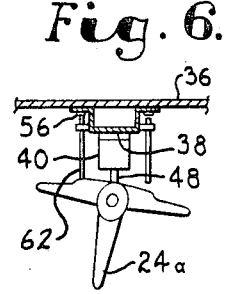
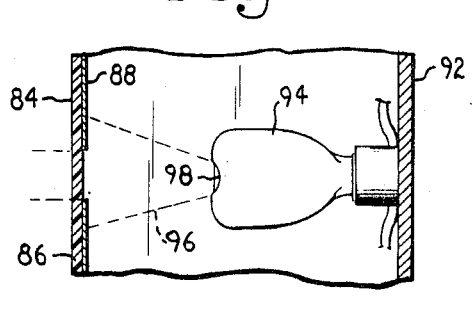

SPINAL NERVE TRACER

This invention relates to instructional and demonstrative apparatus for use by practitioners in the healing arts and, in particular, to display apparatus for tracing nerve impulses from the emissions of the spinal nerves at the intervertebral foramen level to the terminal nerve endings thereof.

In the human nervous system, nerve impulses from the brain are conducted by the spinal cord to the various pairs of branching spinal nerves that emanate from the intervertebral foramina. If a vertebra is displaced to a position out of proper alignment with the other vertebrae of the spinal column, interference with the associated spinal nerve may result and be felt as an impairment of the particular organ, muscle, bone or tissue structure at the terminal nerve endings of the affected spinal nerve. Although practitioners in the healing arts are aware of the circuitry of the nervous system from the intervertebral foramen level to the nerve endings, no means is presently available to demonstrate the nerve tracing in a manner readily understandable to the student, the experienced practitioner, or a patient with a displaced vertebral condition to whom an explanation of the cause of his apparent affliction in other parts of his body must be made with full understanding.

It is, therefore, the primary object of the present invention to provide an instructional display apparatus for tracing nerve impulses from the emission of a particular spinal nerve at the intervertebral foramen level to the affected nerve endings.

As a corollary to the foregoing object, it is an important aim of this invention to provide apparatus as aforesaid which visually indicates on a pictorial representation of human anatomy the nerve ending or endings affected by interference with a spinal nerve emanating from a rotated or laterally displaced vertebra.

A further and important object of the invention is to provide such an apparatus in which a simulated human spine is employed that may be manipulated by the attending practitioner or instructor in order that the viewer may see the direct result of the vertebral displacement as indicated on the anatomical representation.

Still another important object of the invention is to provide apparatus as aforesaid in which the pictorial representation of human anatomy contains transparent zones at selected nerve endings, behind which electric lamps are disposed and are energized to illuminate the corresponding zones in accordance with the particular nerve interference to vividly indicate to the viewer the organ, muscle, bone or tissue structure affected by the interference.

In the drawings:

FIG. 3 is an enlarged, fragmentary, horizontal sectional view through the spinal column of the apparatus showing one of the vertebrae and electrical switches associated therewith;

FIG. 4 is a fragmentary, side elevational view of two of the vertebrae and associated switches, on the same scale as FIG. 3;

FIG. 5 and 6 are diagrammatic views illustrating right and left rotation, respectively, of a vertebra;

FIG. 7 is a fragmentary, diagrammatic view showing the manner in which the transparent zones are illuminated; and FIG. 8 is an electrical schematic diagram of a portion of the lighting system.

Figure 1:
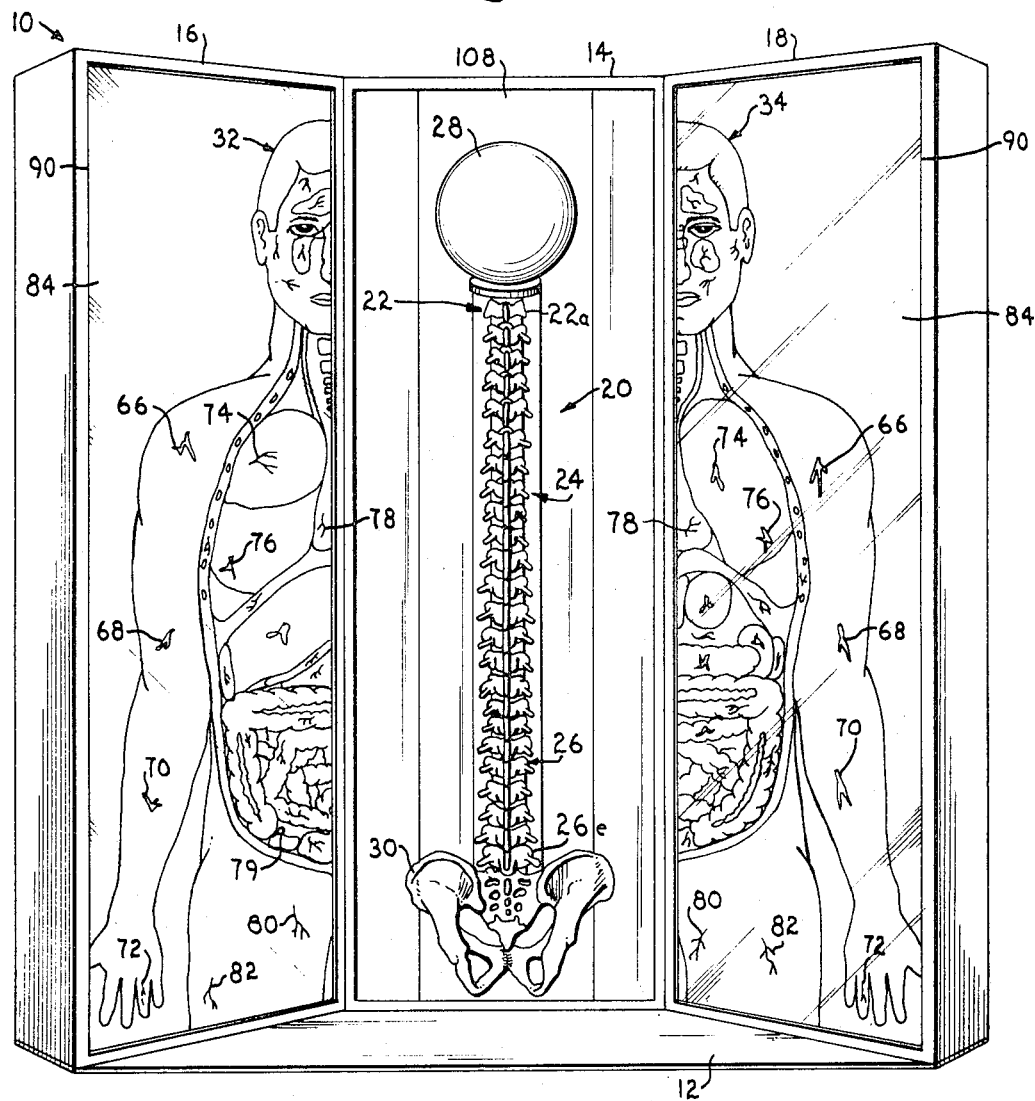
FIG. 1 is a front view of the apparatus of the present invention.
Figure 2:
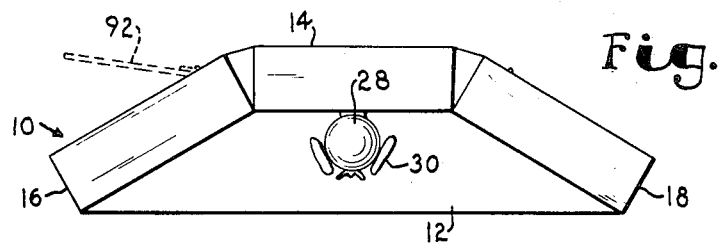
FIG. 2 is a plan view of the apparatus on a reduced scale.

Referring initially to FIGS. 1 and 2, an upright cabinet 10 is supported on a horizontal base 12 and includes a center section 14 and a pair of left and right wing sections 16 and 18 respectively. A simulated human spine 20 is supported in front of the center section 14 in an erect position, and comprises a series of simulated vertebrae of the human anatomy. Accordingly, the reference numeral 22 broadly denotes the seven cervical vertebrae, the numeral 24 designates the twelve thoracic or dorsal vertebrae, and the numeral 26 designates the five lumbar vertebrae. The simulation also includes a representation of a skull 28 above the atlas 22a, and the ilia 30 beneath the fifth lumbar vertebra 26e.

The wing sections 16 and 18 of the cabinet 10 support a pictorial representation of a portion of the human anatomy, such representation being divided into a pair of two-dimensional illustrations 32 and 34 of the right and the left sides, respectively, of the anatomy as seen in a frontal view. It should be noted that the two illustrations 32 and 34, therefore, face generally forwardly toward the viewer, but that the spine 20 faces rearwardly with respect to these illustrations. Accordingly, a viewer standing in front of the cabinet 10 sees the back of the spine 20 as if viewing the human anatomy from the rear, but the illustrations 32 and 34 are seen viewing the human anatomy from the front. For this reason, the illustration 32 of the right side of the body flanks the spine 20 on the left side thereof, and the illustration 34 of the left side of the body flanks the spine 20 on the right side thereof. It may be noted in FIG. 2 that it is preferred that the wing sections 16 and 18 extend forwardly from the center section 14 at an angle for the convenience of a viewer standing directly in front of the spine 20 during operation of the apparatus.

Referring particularly to FIGS. 3 and 4, the first thoracic vertebra 24a is illustrated in both of these figures, together with the seventh cervical vertebra 22g in FIG. 4. An interior wall 36 of the center cabinet section 14 is located adjacent the front of the cabinet and mounts a central, upright support 38 in the nature of a channel member with flanged longitudinal edges. A box member 40 is located in front of the support 38 and is curved to simulate the natural curvature of the erect human spine. The member 40 is rigidly attached to the support 38 at the upper and lower ends of the member 40, the latter serving as a mount for the entire series of vertebrae constituting the simulated spinal column.

In FIG. 3 it may be noted that the vertebra 24a has the characteristic transverse processes 42 beneath which the spinal nerves 44 emanate from the intervertebral foramen. The simulation includes a spinal canal 46 (for the spinal cord) from which the nerves 44 branch. The vertebra 24a is carried by a horizontal stem 48 received within a bushing 50 in the member 40. As is illustrated by the phantom lines in FIG. 3, the stem 48 (and hence the vertebra 24a) is reciprocable in the bushing 50 between the normal position thereof shown in full lines and a laterally displaced position shown by the phantom lines. An enlarged inner end 52 on the stem 48 prevents complete withdrawal of the stem from the bushing 50 and limits its lateral movement.

The term "lateral" as used herein refers to a vertebral displacement in a plane through the human anatomy seen when viewed laterally or at right angles to the anterior-posterior direction. This plane is the plane of a lateral radiograph of the spine used in conjunction with an anterior-posterior radiograph in determining whether a patient has a misaligned vertebra, either laterally displaced or rotated left or right.

The vertebra 24a is attached to the stem 48 by a pivot pin 54 so that left and right rotation is permitted as well as lateral displacement of the vertebra as discussed above. This same arrangement is employed in the attachment of each vertebra to the member 40.

Electrical switching structure comprising a pair of on-off switches 56 and 58 is mounted on the flange portions of the support 38 in horizontal alignment with the vertebra 24a. A pair of brackets 60 mounts two push rods 62 and 64 which are aligned with the operators of the two switches 56 and 58 respectively. These rods 62 and 64 are axially shiftable in the brackets 60 and have forward ends which are engaged by shoulders formed on the back side (anatomical front) of the vertebra 24a as it is rotated from left to right or laterally displaced, as will be discussed hereinafter. As may be seen in FIG. 4, this same switching arrangement is employed for the seventh cervical vertebra 22g, and it is to be understood that similar switching structure and operating linkage is provided for all of the other vertebrae. Accordingly, a series of switches 56 and a series of switches 58 are provided just behind the spine 20 within the central cabinet section 14 so that manipulation of any of the vertebrae to a misaligned position will cause one of the corresponding switches 56 or 58, or both thereof, to be actuated depending upon the type of misalignment.

In FIG. 1, transparent zones on the illustrations 32 and 34 such as indicated at 66 in the shoulder region represent terminal nerve endings of the spinal nerves 44. (The simulated spinal nerves 44 are not illustrated in FIG. 1 in order to clarify the illustration of the spine 20.) Other nerve endings include the upper arm 68, the lower arm 70, the fingers 72, the upper lung 74, the lower lung 76 and the heart 78. In the head, it may be seen that nerve endings are shown for the forehead, upper and lower sinus, ear and cheek. Additional illustrated nerve endings in the trunk comprise the intercostal nerve, diaphragm, liver, kidney, stomach, pancreas, spleen (left side), ascending colon (right side), transverse colon, descending colon (left side), upper and lower small intestines, appendix 79 (right side), bladder, obturator nerve 80 and sciatic nerve 82. As will be discussed hereinafter, nerve impulses are also traced to the gall bladder on the right side of the body and the islet of Langerhans on the left side, the transparent zones representing such endings being omitted from FIG. 1 in the interest of clarity.

Referring to FIGS. 1 and 7, the forwardly facing viewing surface 84 of each of the illustrations 32 and 34 is presented by a transparent mat 86 upon which the picture of the anatomy is painted on the back side. The layer of paint is represented at 88 in FIG. 7, where it may be seen that the transparent zone 66 is depicted by a break in the paint layer. In order to protect each of the mats 86, it is preferred that a plexiglass plate 90 supported in a suitable frame be employed in each of the wing sections 16 and 18 in front of the mat 86. With reference to FIG. 2, it may be seen that the wing section 16 is provided with a rear panel 92 in the nature of a hinged door which may be swung to an open position as illustrated by the broken lines. A portion of this panel 92 is shown in FIG. 7, and is employed as a mounting board for the various electrical devices of the apparatus. Such devices include a number of electric lamps which are disposed directly behind the transparent zones in the mat 86 when the panel 92 is in its normal, closed position. One such lamp 94 is shown in FIG. 7 in alignment with the zone 66. In order to restrict the cone 96 of the light rays emanating from the lamp 94, the latter may be covered with an opaque material such as aluminum foil to provide a small, light emitting aperture 98. It may be appreciated that it is necessary to restrict the area of illumination of each of the lamps 94 so that only one transparent zone will be illuminated by a given lamp 94.

NERVE TRACING AND OPERATION

Before describing the operation of the apparatus of the present invention, it is first instructive to set forth the locations of the terminal nerve endings of the various spinal nerves emanating from the intervertebral foramina. For the right side of the body, the following nerve endings are affected when the designated vertebra is rotated to the right out of proper alignment with the other vertebrae. "C" refers to cervical vertebrae, "T" refers to thoracic vertebrae, and "L" refers to lumbar vertebrae.

C1 Upper and lower sinuses
C2 Forehead, cheek, ear
C3 Diaphragm
C4 Shoulder, upper lung, lower lung, heart
C5 Shoulder, upper lung, lower lung, heart
C6 Shoulder, upper arm, lower arm, fingers
C7 Upper lung, lower lung, upper arm, lower arm, fingers, heart
T1 Upper lung, lower lung, upper arm, lower arm, fingers, heart
T2 Upper lung, lower lung, heart
T3 Upper lung, lower lung, heart
T4 Upper lung, lower lung, heart
T5 Liver, pancreas, stomach, gall bladder
T6 Liver, pancreas, stomach, gall bladder
T7 Liver, pancreas, stomach, gall bladder
T8 Liver, pancreas, stomach, gall bladder
T9 Ascending colon, transverse colon, upper intestine, lower intestine, appendix, intercostal nerve
T10 Ascending colon, transverse colon, upper intestine, lower intestine, appendix
T11 Ascending colon, transverse colon, upper intestine, lower intestine, appendix
T12 Ascending colon, transverse colon, upper intestine, lower intestine, appendix
L1 Kidney, bladder
L2 Kidney, bladder, obturator nerve
L3 Obturator nerve
L4 Sciatic nerve
L5 Kidney, bladder, sciatic nerve The nerve tracing to the left side of the body in terms of the affected organ, muscle, bone or tissue structure, when nerve interference is produced by left rotation of vertebrae to a misaligned position, is as follows:

C1 Upper and lower sinuses
C2 Forehead, cheek, ear
C3 Diaphragm
C4 Shoulder, upper lung, lower lung, heart
C5 Shoulder, upper lung, lower lung, heart
C6 Upper arm, lower arm, fingers, shoulder, upper lung, lower lung, heart
C7 Upper arm, lower arm, fingers, shoulder, upper lung, lower lung, heart
T1 Upper arm, lower arm, fingers, shoulder, upper lung, lower lung, heart
T2 Heart, shoulder, upper lung, lower lung
T3 Heart, shoulder, upper lung, lower lung
T4 Heart, shoulder, upper lung, lower lung
T5 Spleen, stomach, islet of Langerhans
T6 Spleen, stomach, islet of Langerhans
T7 Spleen, stomach, islet of Langerhans
T8 Spleen, stomach, islet of Langerhans
T9 Spleen, stomach, islet of Langerhans, intercostal nerve
T10 Transverse colon, descending colon, upper intestine, lower intestine
T11 Transverse colon, descending colon, upper intestine, lower intestine
T12 Transverse colon, descending colon, upper intestine, lower intestine
L1 Kidney, bladder
L2 Kidney, bladder, obturator nerve
L3 Obturator nerve
L4 Sciatic nerve
L5 Kidney, bladder, sciatic nerve In FIG. 8 a portion of the electrical circuitry between the various switches 56 and 58 and the lamps 94 is illustrated. A pair of power leads 100 are connected to a suitable source of electric current. The switch 56 designated C1 is the switch that will be closed upon rotation of the first cervical vertebra or atlas to the left, causing energization of the two lamps 94 that illuminate the nerve endings at the upper and lower sinuses on the left side of the body. The switches 56 from the atlas down through the first thoracic vertebra, T1, for left rotation, are illustrated in FIG. 8. For the right side of the body, the T1 switch 58 is shown connected to the associated lamps 94. The other switch and lamp connections for the left and right sides of the body are not shown in FIG. 8, but such circuitry is evident from the nerve tracing to both sides of the body listed above.

The various switches 56 and 58 are all normally open and are of single pole or multiple pole type depending upon the nerve endings to be illuminated. For example, referring to FIG. 8, the C2 switch 56 is operable to energize the three lamps 94 that illuminate the nerve endings in the forehead, cheek and ear on the left side of the body. The C3 switch 56, when closed, energizes the single lamp 94 that illuminates the diaphragm nerve ending on the left side. The C4, C5, C6, C7 and T1 switches 56 individually control the energization of four lamps 94 corresponding to the shoulder, upper lung, lower lung and heart on the left side. Additionally, a second pole of the C6 switch 56 energizes the three lamps 94 corresponding to the upper arm, lower arm and fingers on the left side, as required by the tracing. A second pole on the C7 and T1 switches 56 also executes this same function.

The first thoracic vertebra 24a shown in detail in FIGS. 3 and 4 is selected for a specific illustration of the operation of the apparatus. It is initially assumed that the practitioner has a patient with a first thoracic vertebra that is out of alignment due to left rotation. For both his own information and in explaining the diagnosis to the patient, the practitioner rotates the simulated vertebra 24a to the left as illustrated in FIG. 6. This pushes the rod 62 rearwardly against the operator of the T1 switch 56, causing closure thereof and energization of the seven lamps 94 shown in FIG. 8. Viewing the illustration 34 of the left side of the body, the transparent zones 66, 74, 76, 78, 68, 70 and 72 are now illuminated to clearly indicate the regions of the body affected by the nerve interference. In order to highlight the indication, a delay relay 102 (FIG. 8) is provided in series with one of the power leads 100 to cause the energized lamps to flash on and off intermittently. The relay 102 may be of the thermal delay type having a heater 104 and a pair of normally closed contacts 106 which open in response to the heat produced by the heater 104. Since the contacts 106 and the heater 104 are in series, it is evident that on and off flashing will be produced since power is interrupted to the heater 104 each time the contacts 106 break.

Now assuming that the first thoracic vertebra of the patient is rotated to the right rather than the left, the simulated vertebra 24a is rotated as shown in FIG. 5 to push the rod 64 against the operator of the T1 switch 58. In FIG. 8 it may be seen that six lamps 94 are thereby energized to illuminate the zones 74, 76, 78, 68, 70 and 72 on the illustration 32 of the right side of the body. Now assuming that the condition is that of a lateral displaced first thoracic vertebra, the simulated vertebra 24a is shifted out of lateral alignment as illustrated by the phantom lines in FIG. 3 to operate both of the T1 switches 56 and 58. Manifestly, the same lamps will be energized that would be energized by both left and right rotation of the vertebra. The switches and lighting circuits of the other vertebrae operate in an analogous fashion in accordance with the nerve tracing set forth hereinabove.

It should be understood that each vertebra of the simulated spine 20 remains in a rotated or laterally displaced position until returned to its normal position by the practitioner or instructor. Accordingly, the affected regions of the body will continue to be indicated on the pictorial illustrations until all displaced vertebrae are returned to normal alignment. In this connection, the internal springs (now shown) within the housings of the switches 56 and 58 serve to reopen the switches once pressure is released from the push rods 62 and 64, thereby also returning such rods to their normal positions illustrated. If desired, individual return springs for the rods 62 and 64 may also be employed.

Since there will naturally be extensive cabling from the switches 56 and 58 to the wing sections 16 and 18 of the cabinet 10, the appearance of the center section 14 is enhanced by the use of a front panel 108 (FIG. 1) which is located just rearwardly of the vertebrae supporting member 40. Furthermore, the panel 108 prevents the operator from accidentally reaching any of the switches 56 or 58 in order to eliminate any possible shock hazard.

Having thus described the invention, what is claimed as new and desired to be secured by Letters Patent is:

1. Instructional display apparatus for tracing a nerve impulse from the emission of the spinal nerve at the intervertebral foramen level to the terminal nerve ending at an organ, a muscle, a bone, or tissue, said apparatus comprising:
   a simulated human spine having a series of vertebrae, each rotatable to the left or right from a normal position in proper alignment with the other vertebrae;
   electrical switching means operable in response to left or right rotation of each of said vertebrae;
   a pictorial representation of human anatomy;
   a plurality of electrically responsive devices operably associated with said representation for illuminating selected nerve endings in said anatomy; and
   circuit means interconnecting said switching means and said devices for energizing a predetermined device or group of devices in response to rotation in one direction of a corresponding vertebra, whereby to visually indicate on said representation the organ, muscle, bone or tissue structure affected by interference with the nerve emanating from the rotated vertebra.

2. Apparatus as claimed in claim 1, wherein said switching means includes a plurality of switching structures, each operably associated with a corresponding vertebra and responsive to rotation thereof, said circuit means interconnecting each of said switching structures and the device or group thereof to be energized when the corresponding vertebra is rotated left or right.

3. Apparatus as claimed in claim 2, wherein each of said vertebrae is shiftable away from its normal position to a displaced position out of lateral alignment with the other vertebrae, each of said switching structures being responsive to shifting of the corresponding vertebra to its laterally displaced position to effect energization of the same devices that could be energized by both left and right rotation of the vertebra, whereby to visually indicate the effect of interference with both nerves emanating from the laterally displaced vertebra.

4. Apparatus as claimed in claim 2, wherein said switching structures are arranged in a series adjacent said series of vertebrae, and wherein linkage means is provided for mechanically coupling each vertebra with the corresponding switching structure.

5. Apparatus as claimed in claim 4, wherein each of said switching structures comprises a pair of switches responsive to left and right rotation, respectively, of the corresponding vertebra.

6. Apparatus as claimed in claim 5, wherein each of said vertebrae is shiftable away from its normal position to a displaced position out of lateral alignment with the other vertebrae, said linkage means effecting operation of both switches of a switching structure in response to shifting of the corresponding vertebra to its laterally displaced position to energize both the device or group thereof that would be energized by left rotation of the vertebra and the device or group thereof that would be energized by right rotation of the vertebra.

7. Apparatus as claimed in claim 1, wherein said representation is provided with a forwardly facing viewing surface upon which said anatomy is pictured, said surface having transparent zones at said selected nerve endings, each of said devices comprising an electric lamp disposed behind said representation adjacent a corresponding zone for illuminating the latter.

8. Apparatus as claimed in claim 1, wherein a central, upright support is provided mounting said spine in an erect position, said representation comprising a pair of two-dimensional illustrations of portions of the left and right sides of the body respectively, said illustrations being disposed in flanking relationship to said spine on opposite sides thereof.

9. Apparatus as claimed in claim 8, wherein each of said illustrations is provided with a forwardly facing viewing surface upon which the respective side of the body is pictured in a frontal view, and wherein said spine is supported in generally rearwardly facing relationship with respect to said illustrations, with the illustration of the left side of the body flanking the spine on the right side thereof and the illustration of the right side of the body flanking the spine on the left side thereof.

10. Apparatus as claimed in claim 9, wherein said viewing surfaces have transparent zones at said selected nerve endings, each of said devices comprising an electric lamp disposed behind a particular illustration adjacent a corresponding zone for illuminating the latter.

* * * * *